(12) United States Patent
Tseng

(10) Patent No.: US 9,183,573 B2
(45) Date of Patent: Nov. 10, 2015

(54) ÜBERFEED

(75) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/152,691

(22) Filed: Jun. 3, 2011

(65) Prior Publication Data

US 2012/0311033 A1 Dec. 6, 2012

(51) Int. Cl.
*G06F 15/16* (2006.01)
*G06Q 30/02* (2012.01)
*G06Q 50/00* (2012.01)

(52) U.S. Cl.
CPC ............ *G06Q 30/0269* (2013.01); *G06Q 50/01* (2013.01)

(58) Field of Classification Search
USPC ........................................................ 709/204
See application file for complete search history.

(56) References Cited

U.S. PATENT DOCUMENTS

| | | | |
|---|---|---|---|
| 6,026,388 A | 2/2000 | Liddy | |
| 6,088,692 A | 7/2000 | Driscoll | |
| 2008/0040474 A1* | 2/2008 | Zuckerberg et al. | 709/224 |
| 2008/0147640 A1 | 6/2008 | Schachter | |
| 2009/0070412 A1* | 3/2009 | D'Angelo et al. | 709/203 |
| 2010/0049852 A1 | 2/2010 | Whitnah | |
| 2010/0169301 A1 | 7/2010 | Rubanovich | |
| 2010/0325129 A1 | 12/2010 | Ahuja | |

FOREIGN PATENT DOCUMENTS

| | | |
|---|---|---|
| CN | 101631311 A | 1/2010 |
| CN | 101681459 A | 3/2010 |
| CN | 101729571 A | 6/2010 |

OTHER PUBLICATIONS

International Search Report and Written Opinion for International Application PCT/US2012/040146, Feb. 1, 2013.
G. Schatter, et al.: "*Subscription of Digital Broadcast Content Utilizing the Syndication Feeds Mechanism*," IEEE Transactions on Consumer Electronics, vol. 54, No. 4, pp. 2015-2022, Nov. 1, 2008.
European Search Report for EP Application No. EP 12 79 3226, Oct. 14, 2014.
First Office Action from State Intellectual Property Office of China for CN Application No. 201280038269.8 with English translation, 14 pgs., Jul. 2, 2014.
MX Office Action from Mexican Institute of Industrial Property (IMPI) for MX Patent Application No. MX/a/2013/014212 (with English translation), Apr. 16, 2015.
State Intellectual Property Office of the People's Republic of China Notification of Second Office Action for Chinese Patent Application No. 2012800382698 (with English translation), Dec. 17, 2014.

(Continued)

*Primary Examiner* — Sulaiman Nooristany
(74) *Attorney, Agent, or Firm* — Baker Botts L.L.P.

(57) ABSTRACT

In one embodiment, a computing device may collect a plurality of information items of a plurality of types relevant to a user; rank the plurality of information items based on their respective degrees of relevance to the user; construct an information feed that includes the plurality of information items in an order of their respective ranks; and send the information feed to a user device associated with the user for presentation of the plurality of information items to the user in the order of their respective ranks.

18 Claims, 3 Drawing Sheets

(56) References Cited

OTHER PUBLICATIONS

AU Patent Examination Report No. 1 for AU Patent Application No. 2012262203 from Australian Patent Office, Aug. 4, 2015.

The State Intellectual Property Office of the People's Republic of China "Notification of the Third Office Action" for Chinese Patent Application No. 2012800382698 (with English translation), Jun. 10, 2015.

* cited by examiner

ÜBERFEED

TECHNICAL FIELD

This disclosure generally relates to pushing information to user devices and more specifically relates to compiling information relevant to a specific user from multiple sources and pushing the compiled information to the user's device.

BACKGROUND

In network communications, there are two ways to send information in the form of a communication from one device to another device: push and pull. With push technology, the request for the communication transaction is initiated by the sending device. That is, the sending device "pushes" the communication (i.e., information), so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication (i.e., information), so to speak, from the sending device. In this case, the sending device may be considered the passive party and the receiving device may be considered the active party in the transaction.

SUMMARY

This disclosure generally relates to pushing information to user devices and more specifically relates to compiling information relevant to a specific user from multiple sources and pushing the compiled information to the user's device.

In particular embodiments, a computing device may collect a plurality of information items of a plurality of types relevant to a user; rank the plurality of information items based on their respective degrees of relevance to the user; construct an information feed that includes the plurality of information items in an order of their respective ranks; and send the information feed to a user device associated with the user for presentation of the plurality of information items to the user in the order of their respective ranks.

These and other features, aspects, and advantages of the disclosure are described in more detail below in the detailed description and in conjunction with the following figures.

DESCRIPTION OF EXAMPLE EMBODIMENTS

Figure 1:
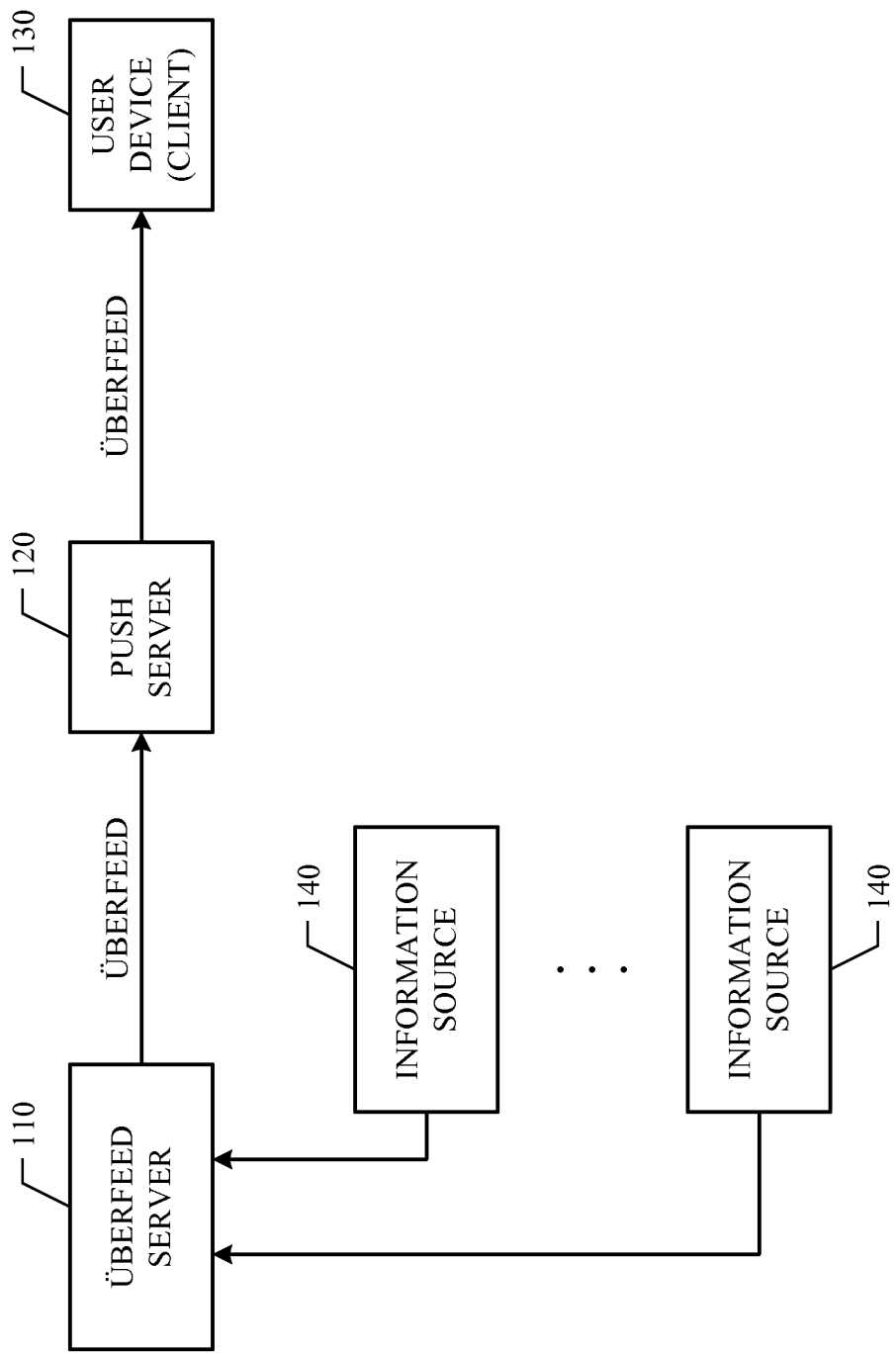
FIG. 1 illustrates an example system for compiling information relevant to a user from multiple sources and pushing the compiled information to the user's device.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In network communications, one device may "push" information or data, in the form of a communication, to another device. With push technology, the sending device typically initiates the communication transaction and may, in some cases, transmit the communication to the receiving device without obtaining a permission from the receiving device first. Push technology may be used under various circumstances. For example, in a client-server environment, a server may push communications to a client. In this case, the client may be a device associated with a user (i.e., a user device), such as, for example and without limitation, a desktop computer, a game console, or a mobile device (e.g., a mobile telephone, a smart phone, a tablet computer, a personal digital assistant (PDA), etc.) capable of wire-line or wireless communications, and the server may push communications, sent over a computer or communication network, to the user device.

In particular embodiments, a social-networking system implemented, for example, as a social-networking website, may push communications to the client devices associated with its users. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

There are various types of communications that may be pushed to a user device, such as, for example and without limitation, system update messages, advertisements, alerts, user account notices, social-networking messages, service agreement updates, news, application information, or a combination of different types of communications. This disclosure contemplates any applicable types of communications. The content of the individual communications may vary. In particular embodiments, a communication pushed to a user device may be referred to as a "push notification". Examples of push notifications may include, without limitation, Short Message Service (SMS) notifications and news feeds.

In particular embodiments, given a specific user (e.g., a user of a social-networking system), various types of information relevant to the user (e.g., relevant to the user himself or relevant to the user's life) obtained from multiple sources may be mixed and combined into a single, yet comprehensive information feed, which may be referred to as a "überfeed". The term "über" is a prefix originated from German, which may convey the meaning of "increased elevation or quantity", "superiority", or "excessive degree". Thus, a überfeed may include many different types and pieces of information obtained from many different sources. In particular embodiments, the specific informational content contained in a überfeed is user specific. That is, the information contained in a überfeed constructed for one user may differ from the information contained in a überfeed constructed for another user. In addition, the specific informational content contained in a überfeed constructed for a specific user may also be time and/or location specific. A überfeed may thus provide a single information feed (i.e., a single information source) that includes all types of information relevant to the user. Consequently, the user only needs to look to one information source for all the information he may need.

Figures 2, 3:
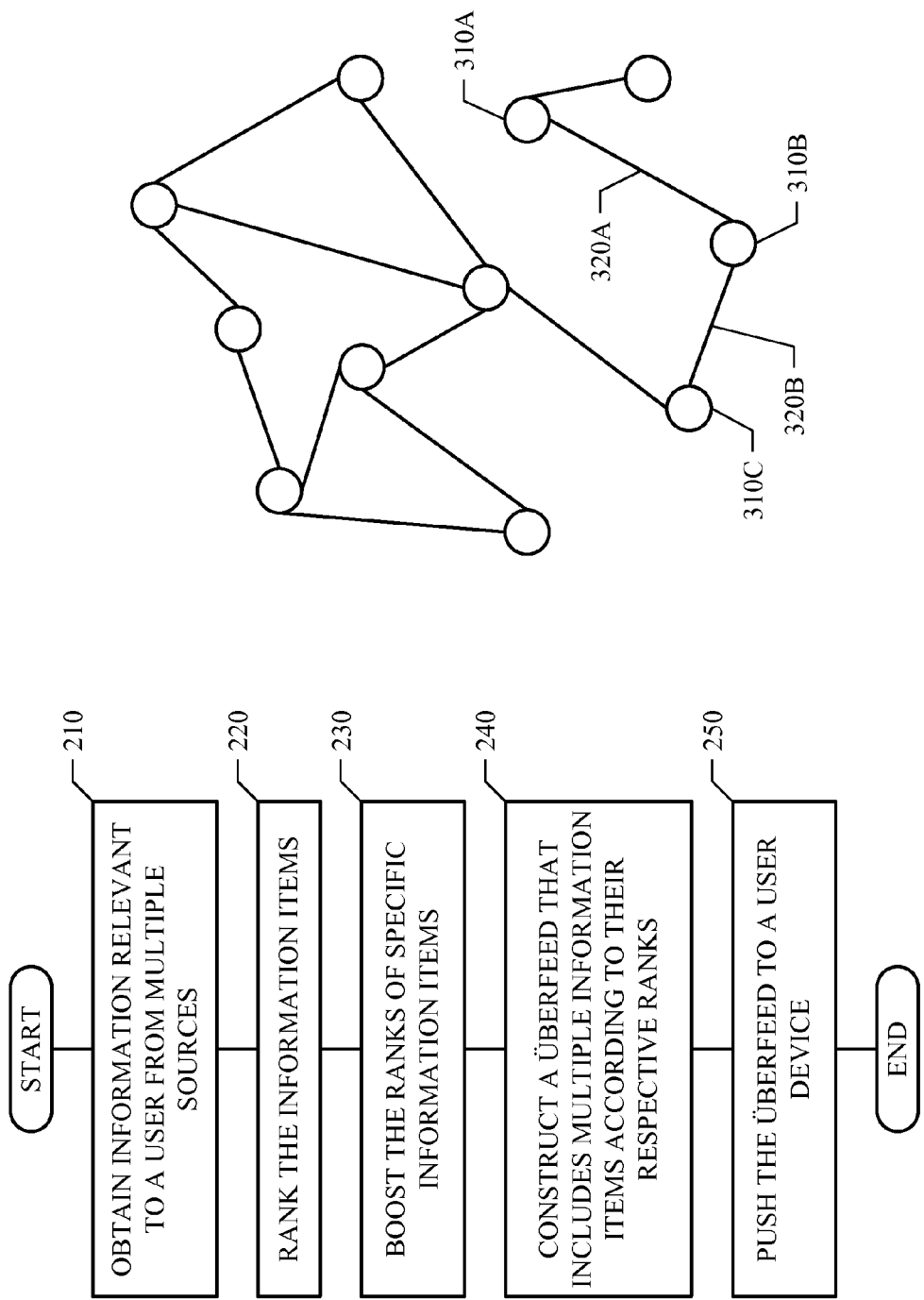
FIG. 2 illustrates an example method for compiling information relevant to a user from multiple sources and pushing the compiled information to the user's device.
FIG. 3 illustrates an example graph that represents the information associated with a social-networking system.

FIG. 1 and FIG. 2 illustrate an example system and an example method, respectively, for compiling information relevant to a user from multiple sources and constructing the information into a überfeed for the user. FIGS. 1 and 2 are described in connection with each other.

In particular embodiments, given a specific user of a social-networking system, information relevant to the user may be obtained from multiple sources, as illustrated in STEP 210 of FIG. 2. For example, as illustrated in FIG. 1, there may be any number of information sources 140 connected, directly or indirectly (e.g., over computer or communication networks), to a überfeed server 110. Each information source 140 may provide some type or types of information, and this disclosure contemplates any applicable type of information. Examples of the different types of information supplied by various information sources 140 may include, without limitation, news (e.g., news feed), notices, advertisements, network content (e.g., information publicly available on the Internet), messages (e.g., email or SMS), social-networking information (e.g., information associated with the social-networking system, such as status of the user's social connections, social events, etc.), web-based applications (e.g., online games), the user's private or personal information (e.g., information stored on the user's device, such as the contact information of the user's family and friends stored in the user's address book), and so on. In particular embodiments, überfeed server 110 may gather and collect any or all available information from the corresponding information sources 140. In some cases, überfeed server 110 may pull the informational data from some information sources 140 as needed, while in other cases, some information sources 140 may push the information data to überfeed server 110 from time to time. For example, überfeed server 110 may subscribe to multiple RSS (Really Simple Syndication) feeds, which may include blog entries, news headlines, audio, video, etc., from various feed publishers.

In particular embodiments, the information may be organized into two categories: deterministic and non-deterministic. In particular embodiments, deterministic information is not much affected by the passage of time (i.e., it is not time sensitive). Deterministic information remains available and present regardless of how much time has passed since the information has first come into existence. It is persistent until the user has dealt with it. For example, an email or SMS may be considered deterministic information. The email or SMS remains in the user's inbox until the user has deleted it, with or without reading it first. On the other hand, non-deterministic information is more affected by the passage of time (i.e., it is time sensitive). Non-deterministic information may become irrelevant or obsolete after some period of time has passed since the information has first come into existence, and thus may go away even if the user has not yet dealt with it. Often, the longer the time has passed, the less relevant or important the information becomes. For example, a news story may be considered non-deterministic information. When the news story has first come into existence (i.e., when the subject matter of the news story has just taken place), the news story is likely to be very important and thus very interesting. However, as time passes, the effect of the subject matter of the news story gradually decreases. As a result, the news story may become less and less important and interesting. As another example, information about a social event (e.g., time, location, attendees, etc.) may also be considered non-deterministic information. Before and up to the time the social event takes place, the information may be important to its attendees. However, after the social event has completed, the information may become obsolete.

What specific pieces of information are considered relevant to the user may depend on many factors, and this disclosure contemplates any applicable relevance factor. In some cases, the information may be directly or personally related to the user. For example, messages (e.g., emails or SMS) sent to the user are certainly relevant to the user. As another example, if the user is invited to a social event, then information about the event is relevant to the user. As a third example, if a friend of the user's has updated her status or information, the user may need to be aware of the update. In other cases, even though the information may not be directly related to the user, it may nevertheless be considered relevant to the user. For example, if the user is interested in sports, then some sport news stories may be relevant to the user even though the user is not directly connected with or does not participate in the actual events of the news stories. As another example, if the user is an environmental activist, then research results on climate change may be relevant to the user even though the user is not personally involved with the research projects.

In some cases, a piece of information may be considered relevant to the user at one time but not at another time (i.e., relevancy is time sensitive). For example, suppose that the user lives in San Francisco but is to travel to New York City for a week. Shortly before and during the user's trip, information about New York City (e.g., weather, transportation system, restaurants, etc.) may be relevant to the user, while at other times (e.g., after the trip has been completed), the user may not be interested in the information about New York City.

Similarly, in some cases, a piece of information may be considered relevant to the user while the user is at one location but not while the user is at another location (i.e., relevancy is location sensitive). Again, with the above example, while the user is in New York City, the user may be interested in the information about New York City. But when the user is in San Francisco, the user may be interested in the information about San Francisco, and may not be concerned with New York City.

In particular embodiments, any information known about the user may be used to help determine whether a piece of information is relevant to the user. For example and without limitation, the user's demographic information (e.g., age, gender, family status, profession, education, financial status, address, etc.), interests and hobbies, social connections, online activities, current location, etc. as well as the current time may be used to help determine whether a piece of information is relevant to the user.

In particular embodiments, the location of the user device may help determine the current location of the user himself, since the user is typically with his device. For example, if the user device is a mobile device, then the mobile device may provide location sensor data (e.g., Global Positioning System (GPS) data) that may be used to determine the current location of the mobile device, and consequently the current location of the user. If the user device is not a mobile device (e.g., a desktop computer), then the location of the user device is relatively fixed and may be known ahead of time (e.g., the desktop computer is located in the user's office or home). In addition, the Internet Protocol (IP) address of the user device may also be used to determine the current location of the user device.

In particular embodiments, as the user is a member of the social-networking system, information relevant to the user may be determined from information associated with the social-networking system. A social-networking system may contain a vast amount of information related to its users. Such information is not limited to the social connections of the individual users, but may include, for example and without limitation, demographical information, network or social activities, behavior profiles, and personal preferences, interests, or hobbies of the individual users. Particular embodiments may represent the information contained in a social-networking system using a graph that may have any number of nodes and edges, an example of which is illustrated in FIG. 3.

In graph 300 illustrated in FIG. 3, each node may represent an entity, which may be human (e.g., user of the social-networking system) or non-human (e.g., location, event, action, business, object, message, post, image, web page, news feed, etc.). Two nodes are connected with an edge if the two nodes are related in some way (i.e., there is a relationship between the two nodes). Example cases when two nodes in graph 300 may be related and thus connected with an edge may include, without limitation, (1) the two nodes represent two users of a social-networking system respectively, and the two users are socially connected (e.g., friends of each other); (2) the two nodes represent a user of the social-networking system and an event respectively, and the user has attended the event; (3) the two nodes represent a user of the social-networking system and a location, and the user has been to the location; (4) the two nodes represent a user of the social-networking system and the user has interacted with (e.g., viewed) the web page; (5) the two nodes represent an event and a location respectively, and the event is held at the location; (6) the two nodes represent a user of the social-networking system and an image (e.g., a digital photograph) respectively, and the user is in the image; (7) the two nodes represent a user of the social-networking system and a product (e.g., a mobile telephone) respectively, and the user owns and uses the product; and (8) the two nodes represent a user of the social-networking system and a software application (e.g., a web-based game) respectively, and the user uses the application (e.g., plays the game). A connection may exist between two humans, a human and a non-human entity, and two non-human entities. Any type of relationship between two human or non-human entities may result in a connection between the two entities.

In graph 300, when there is an edge between two specific nodes, the two nodes may be considered directly related. For example, edge 320A connects nodes 310A and 310B, and thus nodes 310A and 310B are directly related. Similarly, edge 320B connects nodes 310B and 310C, and thus nodes 310B and 310C are directly related. When there is no edge between two particular nodes, the two nodes may still be considered indirectly related. For example, there is no edge directly connecting nodes 310A and 310C; however, nodes 310A and 310C may still be considered indirectly related through node 310B.

With respect to node 310A, node 310B has a closer relationship to it than node 310C, because in graph 300, it takes one hop to go from node 310A to node 310B, but it takes two hops to go from node 310A to node 310C (i.e., through node 310B). In particular embodiments, with respect to two specific nodes, the less number of hops it takes to traverse from one node to another node, the closer the two nodes are related.

In particular embodiments, a graph, such as the one illustrated in FIG. 3, may be used to help determine what information is relevant to the user. Since the user is a member of the social-networking system, one of the node in the graph corresponds to and represents the user. The information represented by the other nodes near the node representing the user may be considered relevant to the user. Furthermore, in particular embodiments, the closer a node is to the node representing the user, the more relevant the information represented by that node is to the user.

Thus, as described above, in particular embodiments, given a specific user at a specific time and/or in a specific location, überfeed server 110 may collect information relevant to the user, optionally taking into consideration the current time and/or location, from various information sources 140. In particular embodiments, the pieces of information thus collected, hereafter referred to as "information items", may be ranked based on their respective degrees of relevance to the user, again optionally taking into consideration the current time and/or location, as illustrated in STEP 220 of FIG. 2. In other words, information items that are relatively more relevant to the user are ranked higher than information items that are relatively less relevant to the user.

In particular embodiments, to rank the information items, a ranking score may be computed for each information item. The algorithm or equation used to compute the ranking score may take into consideration various factors (e.g., in the form of input variables), and this disclosure contemplates any applicable ranking factor. For example and without limitation, time, location, relevance level as indicated by the graph associated with the social-networking system, etc. may all be incorporated into the ranking algorithm as different input variables. The following is an example algorithm that may be used to compute the ranking score of each information item:

$$score = c \times time\_relevance \times location\_relevance \times graph\_relevance$$

In the above equation, the term "time_relevance" may be used to indicate how close the time associated with the information item is to the current time; the term "location_relevance" may be used to indicate how close the location associated with the information item is to the current location; and the term "graph_relevance" may be used to indicate how close the node representing the information item is to the node representing the user in the graph associated with the social-networking system. In addition, the term "c" may be a coefficient. For example, when appropriate, "c" may be used to artificially increase the ranking score, and thus boost the rank, of a specific information item. Of course, it is possible that a specific information item may not be associated with a time, a location, or represented by a node in the graph associated with the social-networking system. In particular embodiments, if a specific factor is not available with respect to an information item, that factor may be ignored (e.g., not used in the above algorithm).

In particular embodiments, the respective ranking scores of certain information items may be artificially increased in order to boost the ranks of these information items, as illustrated in STEP 230 of FIG. 2. Whether to boost the rank of a specific information item and how much the ranking score of the information item is actually increased may depend on many factors, and this disclosure contemplates any applicable rank-boosting factor.

As a first example, some information items are considered deterministic information while some information items are considered non-deterministic information. As described above, the relevance or importance level of a non-deterministic information item may decrease as time passes. If the user does not receive, view, or interact with the non-deterministic information item relatively quickly, the non-deterministic information item may become irrelevant or obsolete. Thus, in some cases, the ranking score of a non-deterministic information item may be artificially increased (e.g., using the term "c" in the above algorithm) so that the user may receive and interact with the non-deterministic information item sooner rather than later (e.g., before the non-deterministic information item becomes irrelevant or obsolete). For example, the ranking score of a headline news story may be artificially increased so that the user may read the headline news story while the event described in the news story is still recent and fresh.

Alternatively or in addition, since a non-deterministic information item may go away after some time, in particular embodiments, the term "c" in the above algorithm may be used to make the non-deterministic information item more persistent (i.e., not going away) by, for example, selecting a relatively high coefficient value for the term "c".

As a second example, some information items may be associated with specific time. In some cases, the ranking score of an information item whose associated time is close to the current time may be artificially increased. For example, suppose that a social event (e.g., a dinner party) is scheduled to begin on Saturday at 8:00 pm. Further suppose that although the user has been invited to the event, the user has decided not to attend due to a schedule conflict. Thus, normally, this specific social event may not be considered very relevant to the user since the user has already decided not to attend the event. However, if the current time is Saturday at 7:30 pm, which is close to the time of the event, then the ranking score of the event may be artificially increased to remind the user about the event in case the user may change his mind or in case the schedule conflict no longer exists.

As a third example, some information items may be associated with specific locations. In some cases, the ranking score of an information item whose associated location is the same as or near the current location of the user (e.g., as indicted by the current location of the user's device) may be artificially increased. For example, suppose that the user lives in San Francisco. Thus, normally, a restaurant near Times Square in New York City has little or no relevance to the user. However, if the user is currently visiting New York City and happens to be sightseeing in Times Square, then the ranking score of the restaurant near Times Square may be artificially increased in case the user may be interested in finding a nearby establishment to have lunch.

In particular embodiments, a überfeed may be constructed for the user, which includes the information items in the order of their respective ranks, as illustrated in STEP 240 of FIG. 2. For example, überfeed server 110 of FIG. 1 may collect and rank the information items and construct the überfeed based on the information items for the user.

In particular embodiments, the überfeed may be pushed to a user device associated with the user, as illustrated in STEP 250 of FIG. 2. The information items in the überfeed may be presented to the user (e.g., displayed on the screen of the user's device) according to their respective ranks. For example, überfeed server 110 of FIG. 1 may forward the überfeed to a push server 120, which in turn pushes the überfeed to a user device 130. In particular embodiments, pushing a überfeed to user device 130 is similar to pushing a notification to user device 130.

The example system illustrated in FIG. 1 includes überfeed server 110 for collecting and ranking the information items and constructing the überfeeds, and push server 120 for pushing the überfeeds to user devices 130. Alternative system architectures may also be possible. For example, a single server may replace both überfeed server 110 and push server 120 (i.e., both constructing and pushing the überfeeds).

Although a überfeed provides a single, comprehensive information source from which a user may receive all types of information relevant to the user, certain information items, although may already be included in a überfeed, may still be delivered to the user's device separately, in addition to the überfeed. Alternatively, certain information items may be excluded from the überfeed and delivered to the user's device separately. For example, the user may choose to receive his emails separately, not as a part of the überfeeds. In this case, the user's emails may be excluded from the überfeeds constructed for the user and delivered to the user separately (e.g., through an email application).

In particular embodiments, a user may specify which types of information should be included in the überfeeds and which types of information should be excluded from the überfeeds and delivered separately, or which types of information should be included in the überfeeds as well as delivered separately. The user's customization settings with respect to the überfeeds may be stored in the user's profile associated with the social-networking system. When constructing überfeeds for a user, the user's customization settings may be consulted to determine which information items should or should not be included in the überfeeds.

Figure 4:
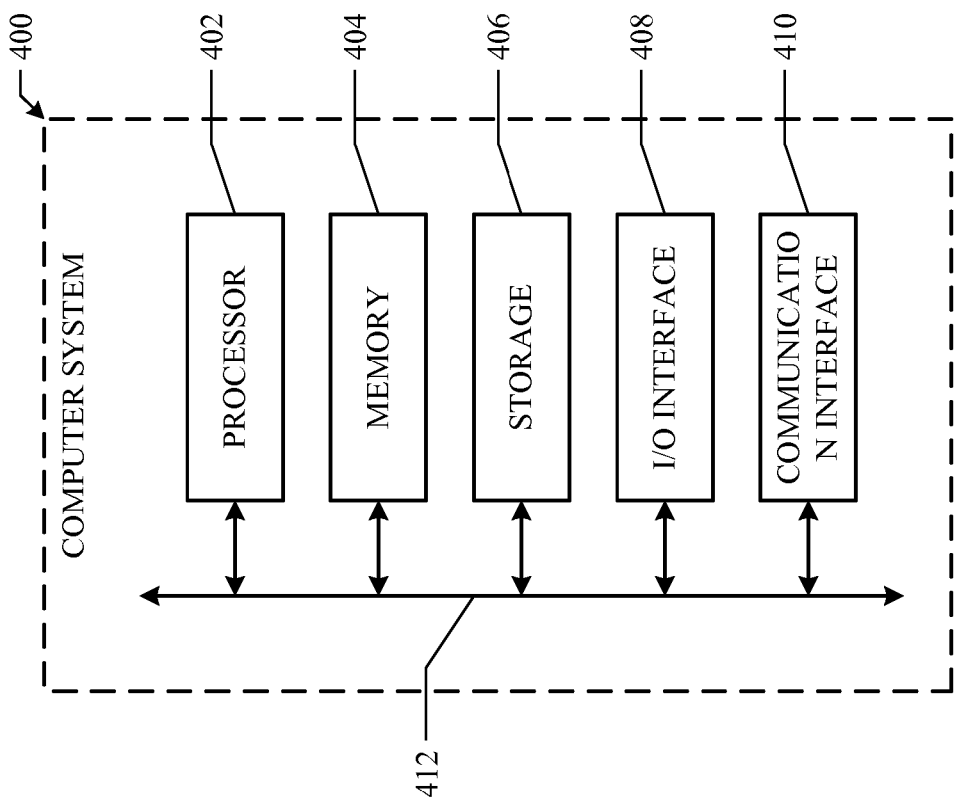
FIG. 4 illustrates an example computer system.

The functionalities of überfeed server 110 (e.g., collecting and ranking information items and constructing überfeeds) described above may be implemented as a series of instructions stored on a computer-readable storage medium that, when executed, cause a programmable processor to implement the operations described above. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    collecting, by one or more computing devices, a plurality of information items of a plurality of types relevant to a user, wherein:
        the information items are collected from at least one social-networking system and at least one third-party system; and the user is a member of the at least one social-networking system;
determining, by one or more computing devices, a relevance value for each of the information items, wherein the relevance value is based at least in part on:
 how close a time associated with the information item is to a current time; and
 how close a node representing the information item is to a node representing the user in a graph associated with the social-networking system, the graph representing information contained in the social-networking system;
classifying, by one or more computing devices, one or more of the information items as being non-deterministic based at least in part on each of the non-deterministic information items having a relevance value that decreases with time;
classifying, by one or more computing devices, one or more other ones of the information items as being deterministic based at least in part on each of the deterministic information items having a relevance value that remains substantially constant over time;
sending, by one or more computing devices, one or more push notifications to one or more client devices associated with the user, the push notifications comprising one or more of the non-deterministic information items sent in an order of their respective relevance values; and
storing, by one or more computing devices, the deterministic information items for later retrieval by the user.

2. The method of claim 1, wherein the one or more push notifications are sent as one or more Short Message Service (SMS) notifications or as an information feed.

3. The method of claim 1, further comprising boosting one or more relevance values of one or more of the information items.

4. The method of claim 3, wherein the information items whose relevance values are boosted are non-deterministic.

5. The method of claim 3, wherein the information items whose relevance values are boosted are each associated with a time that is close to the current time.

6. The method of claim 3, wherein the information items whose relevance values are boosted are each associated with a location that is near to a current location of the user.

7. A system comprising:
one or more processors; and
a memory coupled to the processors comprising instructions executable by the processors, the processors being operable when executing the instructions to:
 collect a plurality of information items of a plurality of types relevant to a user, wherein:
  the information items are collected from at least one social-networking system and at least one third-party system; and
  the user is a member of the at least one social-networking system;
 determine a relevance value for each of the information items, wherein the relevance value is based at least in part on:
  how close a time associated with the information item is to a current time; and
  how close a node representing the information item is to a node representing the user in a graph associated with the social-networking system, the graph representing information contained in the social-networking system;
 classify one or more of the information items as being non-deterministic based at least in part on each of the non-deterministic information items having a relevance value that decreases with time;
 classify one or more other ones of the information items as being deterministic based at least in part on each of the deterministic information items having a relevance value that remains substantially constant over time;
 send one or more push notifications to one or more client devices associated with the user, the push notifications comprising one or more of the non-deterministic information items sent in an order of their respective relevance values; and
 store the deterministic information items for later retrieval by the user.

8. The system of claim 7, wherein the one or more push notifications are sent as one or more Short Message Service (SMS) notifications or as an information feed.

9. The system of claim 7, wherein the one or more processors are further operable when executing the instructions to boost one or more relevance values of one or more of the information items.

10. The system of claim 9, wherein the information items whose relevance values are boosted are non-deterministic.

11. The system of claim 9, wherein the information items whose relevance values are boosted are each associated with a time that is close to the current time.

12. The system of claim 9, wherein the information items whose relevance values are boosted are each associated with a location that is near to a current location of the user.

13. One or more computer-readable non-transitory storage media embodying software that is operable when executed to:
collect a plurality of information items of a plurality of types relevant to a user, wherein:
 the information items are collected from at least one social-networking system and at least one third-party system; and
 the user is a member of the at least one social-networking system;
determine a relevance value for each of the information items, wherein the relevance value is based at least in part on:
 how close a time associated with the information item is to a current time; and
 how close a node representing the information item is to a node representing the user in a graph associated with the social-networking system, the graph representing information contained in the social-networking system;
classify one or more of the information items as being non-deterministic based at least in part on each of the non-deterministic information items having a relevance value that decreases with time;
classify one or more other ones of the information items as being deterministic based at least in part on each of the deterministic information items having a relevance value that remains substantially constant over time;
send one or more push notifications to one or more client devices associated with the user, the push notifications comprising one or more of the non-deterministic information items sent in an order of their respective relevance values; and
store the deterministic information items for later retrieval by the user.

14. The media of claim 13, wherein the one or more push notifications are sent as one or more Short Message Service (SMS) notifications or as an information feed.

15. The media of claim 13, wherein the software is further operable when executed to boost one or more relevance values of one or more of the information items.

16. The media of claim 15, wherein the information items whose relevance values are boosted are non-deterministic.

17. The media of claim 15, wherein the information items whose relevance values are boosted are each associated with a time that is close to the cunent time.

18. The media of claim 15, wherein the information items whose relevance values are boosted are each associated with a location that is near to a cunent location of the user.

* * * * *